United States Patent [19]

Mansutti et al.

[11] Patent Number: 5,748,511
[45] Date of Patent: May 5, 1998

[54] MULTIPURPOSE HANDHELD ELECTRONIC COMPUTER

[75] Inventors: Silvano Mansutti; Roberto Cardin, both of Padova, Italy

[73] Assignee: 4P S.r.l., Padova, Italy

[21] Appl. No.: 448,327

[22] PCT Filed: Oct. 10, 1994

[86] PCT No.: PCT/EP94/03333

§ 371 Date: Jun. 7, 1995

§ 102(e) Date: Jun. 7, 1995

[87] PCT Pub. No.: WO95/10810

PCT Pub. Date: Apr. 20, 1995

[30] Foreign Application Priority Data

Oct. 11, 1993 [IT] Italy ............................ PD930114 U

[51] Int. Cl.⁶ .............................. G06F 1/16; G06F 3/00; G06F 13/00
[52] U.S. Cl. ................................. 364/708.1; 364/709.16
[58] Field of Search ........................ 364/708.1, 483, 364/709.16, 705.06, 705.5, 705.08, 710.13; 235/58 CF; 346/76 R; 361/679, 680, 681, 686

[56] References Cited

U.S. PATENT DOCUMENTS

| 4,143,382 | 3/1979 | Brill et al. ............... 346/76 R |
| 4,409,467 | 10/1983 | Honjo ................... 235/58 CF |
| 4,674,056 | 6/1987 | Goodfellow ............. 364/483 |
| 5,021,984 | 6/1991 | Meade et al. ........... 364/709.16 |
| 5,057,676 | 10/1991 | Komaki ................. 235/375 |
| 5,110,226 | 5/1992 | Sherman et al. ......... 400/88 |

*Primary Examiner*—Reba I. Elmore
*Assistant Examiner*—Emmanuel L. Moise
*Attorney, Agent, or Firm*—Guido Modiano; Albert Josif

[57] ABSTRACT

A multipurpose handheld electronic computer of the type comprising, in a same box-like body, a keyboard, a display, a CPU, a work memory, a mass storage device, and optional other components such as an acoustic warning device, a clock-calendar, and a communications interface. The computer comprises a printer for printing fanfold and/or single forms in one or more copies.

8 Claims, 2 Drawing Sheets

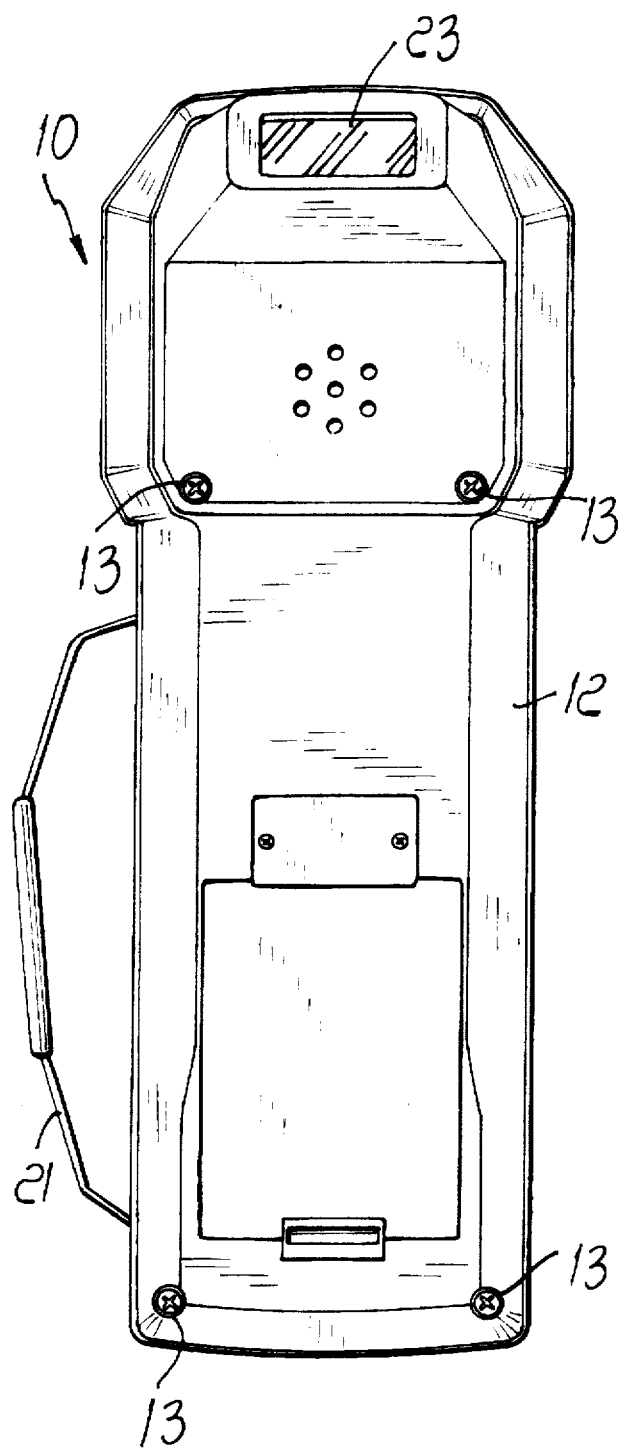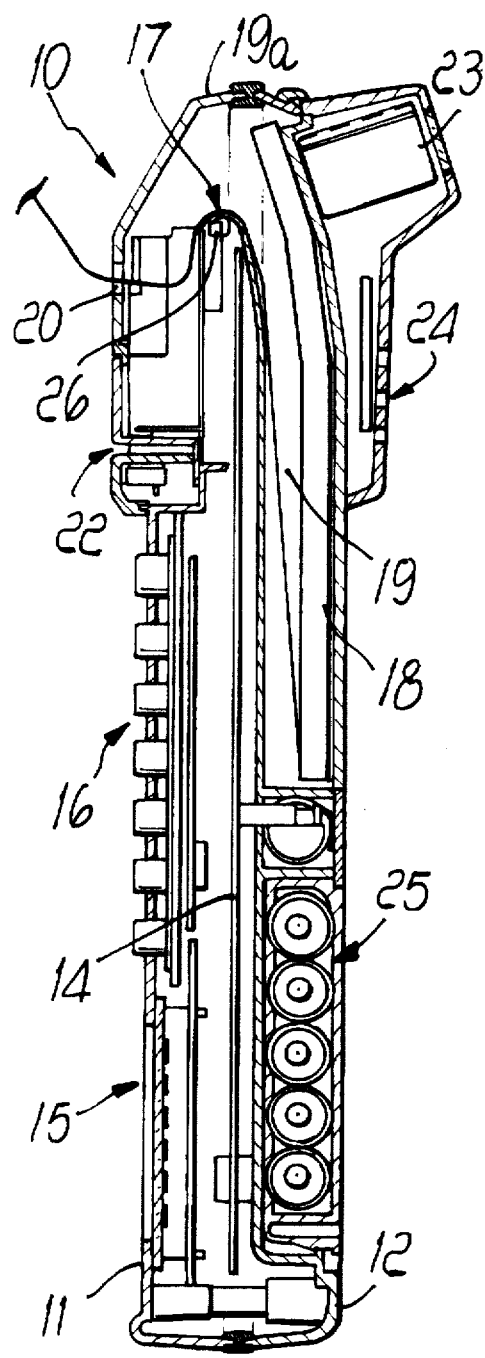
FIG. 2
FIG. 4

MULTIPURPOSE HANDHELD ELECTRONIC COMPUTER

BACKGROUND OF THE INVENTION

The present invention relates to a multipurpose handheld electronic computer.

New-generation portable electronic computers which include a large number of functions in a single apparatus whose size and weight are so small that it can be used on the palm of a hand are already known.

These portable computers generally comprise, in the same body, a keyboard, a display, a CPU, a work memory, a mass storage device, and optionally a clock/calendar, an acoustic warning device, and a communications interface.

In various configurations it is possible to provide a printer for printing on paper rolls.

The use of this type of printer leads to a series of operational limitations and drawbacks, the main one being due to the fact that, after printing, the paper from the roll remains curled or indeed rolls up due to a "memory" effect.

Furthermore, a blackening effect occurs, due to compression, for rolls of chemical or impact paper on their innermost layers when multiple copies are used; this effect consequently worsens printout legibility.

Printing from a roll furthermore does not allow to obtain fiscal or incremental numbering on multiple copies in a way that maintains alignment between the original and the copies from the beginning of the roll to its end.

SUMMARY OF THE INVENTION

A principal aim of the present invention is therefore to provide a multipurpose handheld electronic computer that eliminates the drawbacks and limitations described above in known types.

A consequent primary object is to provide users with a handheld electronic computer that is particularly handy and versatile.

Another object is to provide an ergonomic electronic computer that can be used just with the very hand on the palm whereof it rests for use.

Another object is to provide an electronic computer to which optional modules can be connected.

This aim, these objects, and others which will become apparent hereinafter are achieved by a multipurpose handheld electronic computer of the type which comprises, in a same box-like body, a keyboard, a display, a CPU, a work memory, a mass storage device, and optional other components such as an acoustic warning device, a clock-calendar, and a communications interface, characterized in that it has a printer for printing fanfold and/or single forms in one or more copies.

BRIEF DESCRIPTION OF THE DRAWINGS

Further characteristics and advantages of the invention will become apparent from the following detailed description of an embodiment thereof, illustrated only by way of non-limitative example in the accompanying drawings, wherein:

FIG. 2 is a bottom view of the computer;

FIG. 4 is a schematic longitudinal sectional view of the computer.

DESCRIPTION OF THE PREFERRED EMBODIMENTS

Figure 1:
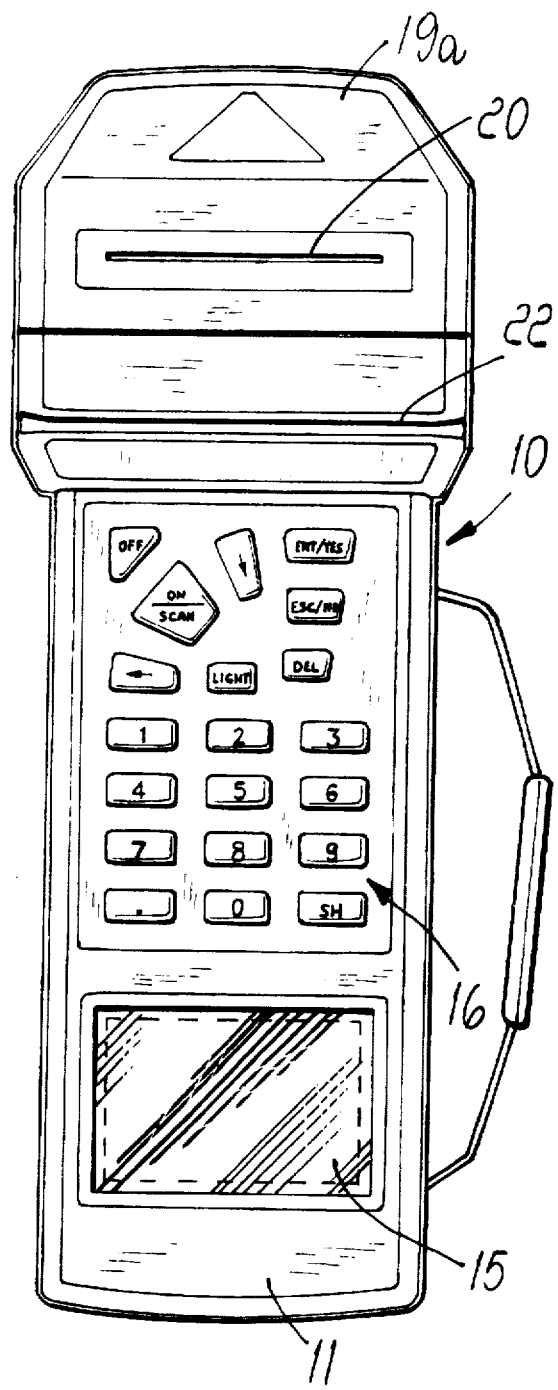
FIG. 1 is a top view of the computer.
Figure 3:
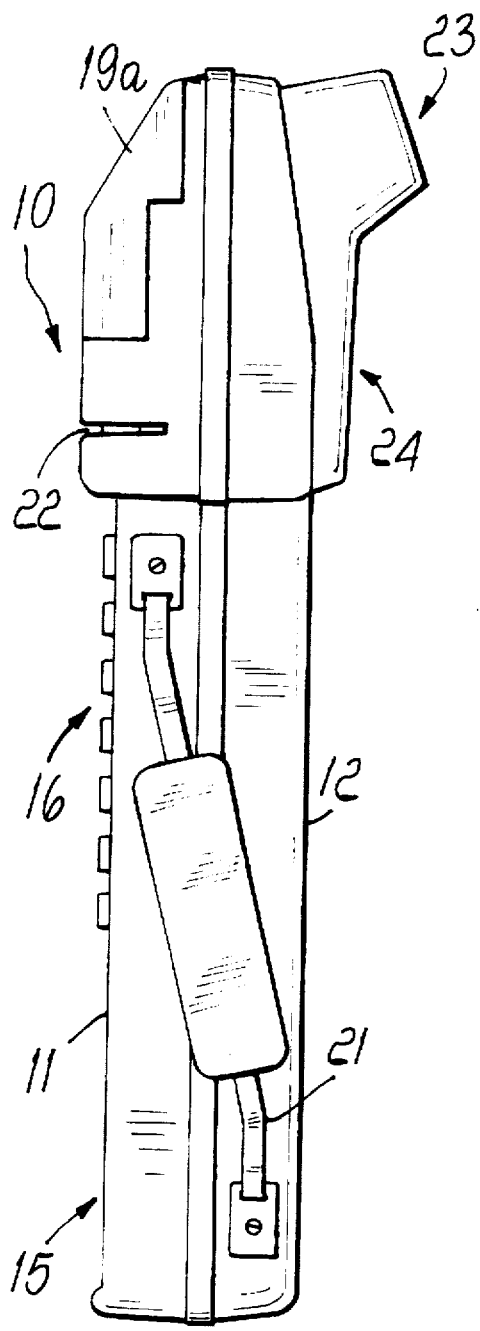
FIG. 3 is a side view of the computer.

With reference to the above figures, an electronic computer according to the invention comprises, in a same elongated flat box-like body 10, made of dust-proof and rain-proof impact-resistant plastic material and composed of two half-shells 11 and 12 joined by screws 13, an electronic motherboard 14 with a CPU, a work memory, and a mass storage device, to which a display 15 and a keyboard 16 are connected.

It is possible to provide for other components, not shown, such as an acoustic warning device, a clock-calendar, and a communications interface.

According to the invention, in this embodiment said box-like body 10 also accommodates a printer 17 for printing on fanfold forms 18.

A lower storage compartment 19 is provided for said forms and can be accessed from an upper loading door 19a.

Said compartment 19 is protected against rain.

As regards the arrangement, with reference to the ergonomics of the unit, the display 15 is arranged in the lower part, the keyboard 16 is located in the median region, and the slit 20 for the exit of the paper of the form 18 is located in the upper part of the body 10.

Of course, in other embodiments the layout of the keyboard and/or of the display may be altered and customized, and the computer may be configured for printing on a single form (original and copies).

The ends of a bridge-like strap 21 are fixed laterally in order to make it easier to grip the body 10; the hand is inserted through said strap, which allows easy use of the keyboard 16 with the thumb of the same hand.

The unit is completed in its upper region by a magnetic card reader 22, which is located between the printer 17 and the keyboard 16, and by a laser scanner 23 which is located, together with a speaker 24, below the compartment 19 for the form 18.

The computer is independently powered by a detachable rechargeable battery pack 25.

An out-of-paper and form alignment sensor 26 is provided, and it is possible to add optional modules that can be combined in different manners as an alternative, and/or in addition, to those already described.

Said optional modules can be:

a CCD reader for reading bar codes by contact;

a radio-link module;

a modem connection module;

a speech-synthesizing module for voice communications;

a contactless-card interface;

a PCMCIA interface.

These modules can be either integrated in the body 10 or applied thereto.

The adoption of a fanfold printer, with the forms accommodated in a suitable compartment, allows to have a handheld electronic computer that can produce printouts on single-copy or multiple-copy paper on blank or preprinted forms so as to maintain, in the latter case, perfect alignment between the base (original) form and the copies.

Fiscal or incremental numbering of the forms is also possible even on multiple copies (form alignment).

The fact of using fanfold forms allows to produce bills and/or receipts that are substantially flat, eliminating the unpleasant curling that occurs in case of roll-fed paper.

In the case of chemical or impact paper, the blackening due in rolls to the compression of the innermost layers when using multiple copies is also eliminated.

Accordingly, there is an improvement in the quality and legibility of the printed copies.

The particular shape of the box-like body 10 and the arrangement of the display 15, of the keyboard 16, and of the printer 17, in addition to the presence of the lateral strap 21, makes the computer particularly ergonomic and allows to use it with a single hand.

Size and weight are conveniently modest.

In practice it has been observed that the intended aim and objects of the present invention have been achieved.

In practice, the materials employed, so long as they are compatible with the contingent use, as well as the dimensions, may be any according to the requirements.

What is claimed is:

1. A multipurpose handheld electronic computer comprising, in a same box-like body (10), a keyboard (16), a display (15), a CPU (14), a work memory (14), a mass storage device (14), a communication port, single power supply means (25), a printer (17) accommodated in an openable compartment (19) of said body (10) and a bar code reader (23), said printer (17) and bar code reader (23) being both powered by said single power supply means (25), said printer printing on fanfold forms of single-copy or multi-copy paper, said fanfold forms of paper being housed into said box-like body, an out-of-paper and form-alignment sensor (26) being associated with said printer (17), said sensor (26) allowing said printer to print said fanfold forms on multi-copy paper, pre-printed on the original and every attached copy.

2. A handheld computer according to claim 1, further comprising a magnetic card reader (22) arranged within said body (10).

3. A handheld computer according to claim 1, wherein said bar code reader (23) is a laser scanner for distance reading of bar codes.

4. A handheld computer according to claim 1, wherein said single power supply means (25) comprises a single rechargeable and detachable battery pack (25) accommodated in said body (10), said single battery pack powering both said printer and said bar code reader.

5. A handheld computer according to claim 1, further comprising within said body (10) a radio-link module, a modem connection module, a speech-syntesizing module for voice communications, a contactless card interface, and a PCMCIA interface.

6. A handheld computer according to claim 1, wherein said box-like body (10) is made of dust-proof and rain-proof material.

7. A computer according to claim 1, wherein said bar code reader (23) is a CCD reader enclosed in said box-like body.

8. A computer according to claim 1, wherein said body (10) is flat and elongated and has, on its upper surface, said display (15) in a lower region, said keyboard (16) in a median region, and said printer (17) in an upper region, a bridge-like strap (21) being fixed laterally to said body (10), the supporting/working hand of the user being insertable in said strap (21), said computer being operable with only one hand.

* * * * *